March 11, 1924.

J. E. HIRES

1,486,664

ASSEMBLING MACHINE FOR INSULATOR KNOBS

Filed May 12, 1921    8 Sheets-Sheet 1

INVENTOR
John Edgar Hires,
by his attorney
J. Edward Thebaud

March 11, 1924.

J. E. HIRES 1,486,664

ASSEMBLING MACHINE FOR INSULATOR KNOBS

Filed May 12, 1921    8 Sheets-Sheet 3

INVENTOR
John Edgar Hires,
by his attorney,
J. Edward Thebaud

March 11, 1924.

J. E. HIRES

ASSEMBLING MACHINE FOR INSULATOR KNOBS

Filed May 12, 1921   8 Sheets-Sheet 6

INVENTOR
John Edgar Hires,
by his attorney,
J. Edward Thebaud.

March 11, 1924.  1,486,664

J. E. HIRES

ASSEMBLING MACHINE FOR INSULATOR KNOBS

Filed May 12, 1921  8 Sheets-Sheet 7

INVENTOR
John Edgar Hires,
by his attorney
J. Edward Thebaud

March 11, 1924. 1,486,664
J. E. HIRES
ASSEMBLING MACHINE FOR INSULATOR KNOBS
Filed May 12, 1921  8 Sheets-Sheet 8

Patented Mar. 11, 1924.

1,486,664

UNITED STATES PATENT OFFICE.

JOHN EDGAR HIRES, OF LANGHORNE, PENNSYLVANIA, ASSIGNOR TO AUTOMATIC MACHINERY AND EQUIPMENT COMPANY, INC., OF PHILADELPHIA, PENNSYLVANIA, A CORPORATION OF DELAWARE.

ASSEMBLING MACHINE FOR INSULATOR KNOBS.

Application filed May 12, 1921. Serial No. 469,016.

*To all whom it may concern:*

Be it known that I, JOHN EDGAR HIRES, a citizen of the United States, residing at Langhorne, in the county of Bucks and State of Pennsylvania, have invented certain new and useful Improvements in Assembling Machines for Insulator Knobs; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to assembling machines for insulator knobs, particularly for that kind of knobs made of porcelain, joined together with a wire nail, having a flexible washer under the head and swaged to expand its diameter below the bottom of the knob.

One of the objects of this invention is to provide an assembling machine for insulator knobs, which shall have various compartments, one for each kind of part of knob, and have mechanism adapted to automatically take these parts, individually from said compartments, and so route them, in synchronous operation, as to bring them together at one point, where they will be assembled and afterward guided to swaging jaws for the final operation, to permanently fix them together.

Another object is to provide in an insulator assembling machine, a washer feeding device, which will receive one washer at a time from a chute connected with the washer compartment, and permit it to drop through a guide, in a manner to position it in the end of a reciprocating member, in a vertical position, to be carried and turned by said member to a point, in a horizontal position, and there held until a nail has been automatically threaded into said washer.

A further object is to provide in an assembling machine, means for actuating both the nail feeding and the washer feeding devices, simultaneously, to supply their respective feeding passages.

Another object is to provide means in connection with the porcelain feeding compartments for automatically releasing a porcelain part from its compartment, when it becomes improperly seated in a recess in the disc.

A further object is to so arrange the power transmission mechanism connected with one power driven shaft, as to synchronize the movements of the various devices to function in routing, in assembling and in discharging the knobs.

With these and other objects, my invention resides in certain construction, one embodiment of which is illustrated in the drawings, is hereinafter described, the operation of the same is explained and what I claim is set forth.

In the drawings,

Figure 9 is an elevation of the stop lever of the controlling device.

In the figures, is shown a frame 1, having a base 2, from which rise two flanged walls 3, upon which is mounted a table top 4. Integral with the table top 4, is a front plate 5, back of which are the bracing walls 6; beneath the table top 4, hangs the rigid gearing box 7 which with the frame 1, forms a firm structure upon which are positioned the other parts of the assembling machine.

At the upper part of the front plate 5 are fixed bearing supports 8, in which are journaled the stub shafts 9, fixed in the projections 10 of the frame 11, of the hopper or container 12. The hopper 12 is divided into two compartments by the partition 13, the compartment 14 being provided for flexible washers 15, and the compartment 16 being provided for nails 17.

At the rear of the frame 1, is a yoke 18, (see Figure 8) fixed to flanges of the side walls 3. Fixed centrally upon the yoke 18, is the bearing 19, in which is journaled an end of the shaft 20, which is journaled at its other end in the bearing 21, integral with the box 7. Journaled upon the shaft 20, is a hobbed gear 22, in mesh with a worm below, mounted and fixed upon the shaft 23, but not shown. Fixed upon the shaft 23, is a pulley 24, engaged by a driving belt 25. The hobbed gear 22 is partly encased by a housing 26, of the usual construction for use with a worm and gear drive. The hobbed gear 22 has a hub extension 27 interlocked with an extension 28, of a fly wheel 29, which is journaled upon the shaft 20.

Figures 9, 11:
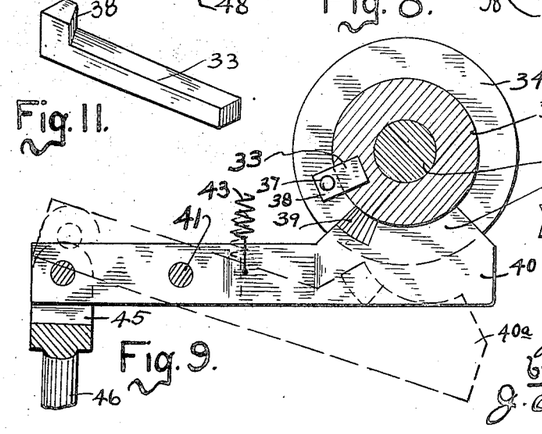
Figure 10:
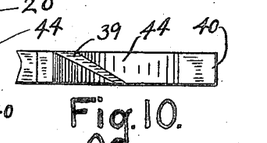
Figure 10 is a top plan of the wedge cam which causes the withdrawal of the sliding key member, shown in perspective in Figure 11.
Figures 12, 16, 17, 18, 19:
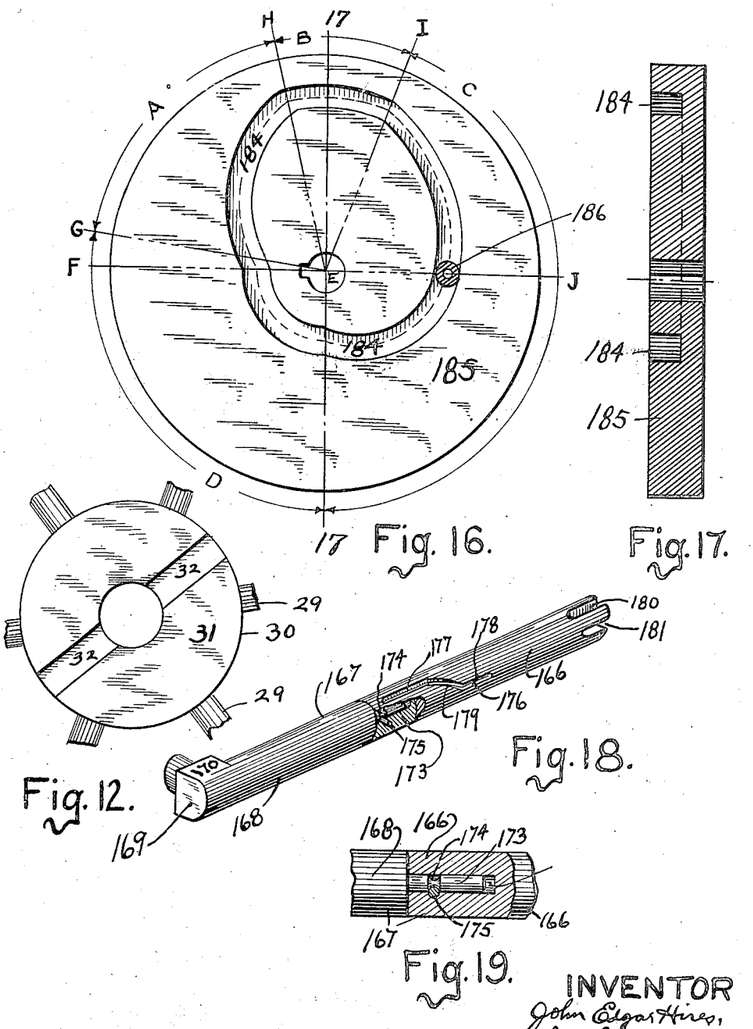
Figure 12 is an elevation showing the slotted end of the hub of the fly wheel, which is engaged by the said key member.
Figure 16 is a face view of the cam which governs the movement of the washer positioning rod.
Figure 17 is a section taken on the line 17—17 of Figure 16.
Figure 18 is a perspective view of the washer positioning plunger, part of which is broken away, showing the joint between the forward and rear portions of the plunger.
Figure 19 is a sectional elevation of the joint between the plunger portions.

Considering now the devices for throwing the power connection with the fly wheel 29 in and out, there are provided in the face 31 on the hub 30 of the fly wheel 29, two radial slots 32, adapted to engage a sliding key 33, (see Figures 11 and 12). This key 33 slidingly engages a rectangular passage through the ring block 34, which is positioned to slidingly contact the face 31 of the hub 30. The ring block 34 is keyed upon the shaft 20 and has an extension 35. Bearing against a lug 36, on the extension 35, is a compression spring 37, the other end of which bears against the head 38 of the key 33. The inside of the head 38 is beveled, relative to its length and is adapted to be engaged by the wedge portion 39 of the lever 40, to cause the withdrawal of the key 33 from engagement with the slot 32. The lever 40 is pivoted upon a screw 41, fixed in the block 42, upon the box 7. There is a tension spring 43 connecting the lever 40 with the underside of the table top 4, and adapted to hold the curved end 44 up against the extension 35, of the ring block 34, so as to position the wedging element 39 to engage the beveled side of the head 38, of the key 33. The opposite end of the lever 40 has pivoted thereto, the bifurcated end 45, of the rod 46. The lower end of which is in pivotal engagement at 47 with the foot lever 48, which is fulcrumed at 49, on the block 50.

Referring next to the swaging cam 51, keyed to the shaft 20, there are two projections 52 for engaging and spreading the lower parts of the arms 53, which are pivoted at 54. The upper ends of the arms 53 are pivoted with hardened jaws 55, shaped to swage nails therebetween, so as to increase the diameter of the nail below the knob, to prevent separation from the porcelain parts.

Considering now the gearing connecting the porcelain positioning discs with the main shaft 20, there is shown keyed to the shaft 20, within the box 7, and next the bearing 21, a spur gear 56, in which meshes a gear 57, of half its diameter. The gear 57 is journaled upon a stub shaft 58, fixed in the boss 59, of the box 7. Also journaled upon the stub shaft 58, but fixed to the gear 57, is the mitre gear 60, having but one group of teeth thereon, at 61 for engagement with the mitre gear 62, which has alternately spaced thereon, six groups of teeth 63, which together with the mitre gear 61, form an intermittent set of gears 61. The mitre gear 62 is fixed upon the vertical shaft 64, which is journaled in the bearing 65, in the floor of the box 7, in a manner to prevent longitudinal movement of the shaft 64. The shaft 64 is journaled in the table top 4 and terminates in a disc 66, to which it is fixed. Upon the shaft 64 is fixed a gear 67, which is in mesh with a gear 68 of equal size, which is fixed upon the shaft 69, journaled in the table top 4, against longitudinal movement. The shaft 69 terminates at its upper end in a disc 70, which is fixed thereon.

The gearing for operating the hopper 12 and the washer positioning plunger 167 is described as follows: Fixed upon the shaft 20, next the gear 56, is the mitre gear 71, which is in mesh with the mitre gear 72, fixed upon the shaft 73, which shaft 73 is journaled in the bearing 74, mounted upon the floor of the box 7, and is also journaled in the bearing 75 in the box 7. Fixed upon the shaft 73, is a beveled gear 76, which is in mesh with a beveled gear 77, of half its size. The beveled gear 77 is fixed to a shaft 78, which is journaled in a bracket 79, fixed upon the box 7, and also a bracket 80 connected with the upper frame of the machine.

Considering the gearing on the left side of the machine connected with the shaft 73 and communicating with the mechanism above the table top 4, there is fixed upon the shaft 73, a mitre gear 81, which is in mesh with another mitre gear 82, fixed upon a shaft 83. The shaft 83, is journaled in a bracket 85, fixed upon the box 7, also journaled in the bracket 85, fixed above the table top 4. Fixed at the upper end of the shaft 78, is a mitre gear 86, which is in mesh with another mitre gear 87, fixed upon the shaft 88. The shaft 88 is journaled in the walls 6, and one end terminates in a crank 89 to which it is fixed.

To give the hopper 12 a swinging movement upon its bearings 8, there is provided a crank 89 with a wrist pin 90 fixed in its swinging end, to which is journaled the upright bar 91. The upper end of the bar 91 is pivoted on a pin 92 in the lug 93, integral with, and depending from the frame 11 of the hopper 12.

For the purpose of partially balancing the hopper 12 with its load and of affording connection for a reciprocating movement to the operating head 108, there is provided a crank 94, fixed to the shaft 88, on the opposite end from the crank 89 and nearly 180 degrees therefrom. Fixed in the swinging end of the crank 94 is a wrist pin 95 on which is journaled a bar 96, which passes through a slot 97, in the table top 4 and is in pivoted engagement with a counter weight 98. Also journaled upon the wrist pin 95 is a link 99, which is pivoted at 100 to a crank 101, fixed upon a shaft 102. The shaft 102 is journaled in the two bosses 103 and 104 on the walls 6. Considering again the shaft 102, there is fixed thereon, a segmental gear 105, which is in mesh with the vertical rack 106, which is fixed to the leg 107, integral with the block 108. The leg 107 is adapted to reciprocate in the ways 109, which are formed between the ledges 110 and the respective vertical strips 111.

Figure 4:
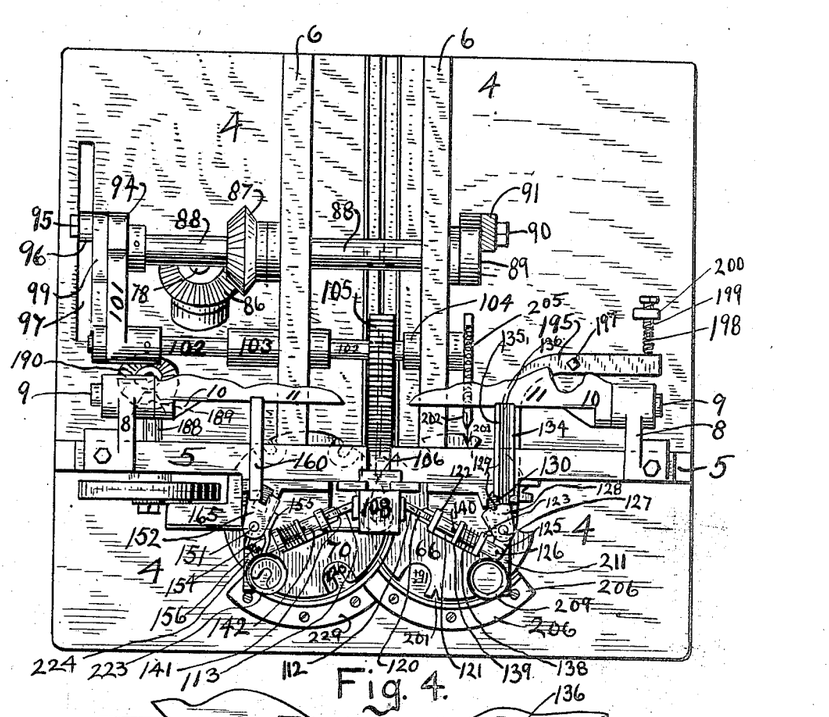
Figure 4 is a top plan.
Figure 5:
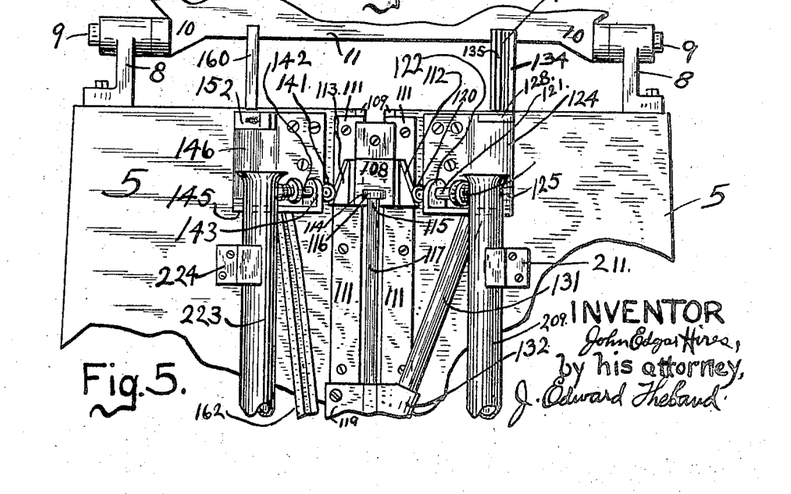
Figure 5 is a front elevation of the upper part of the machine.
Figures 6, 7:
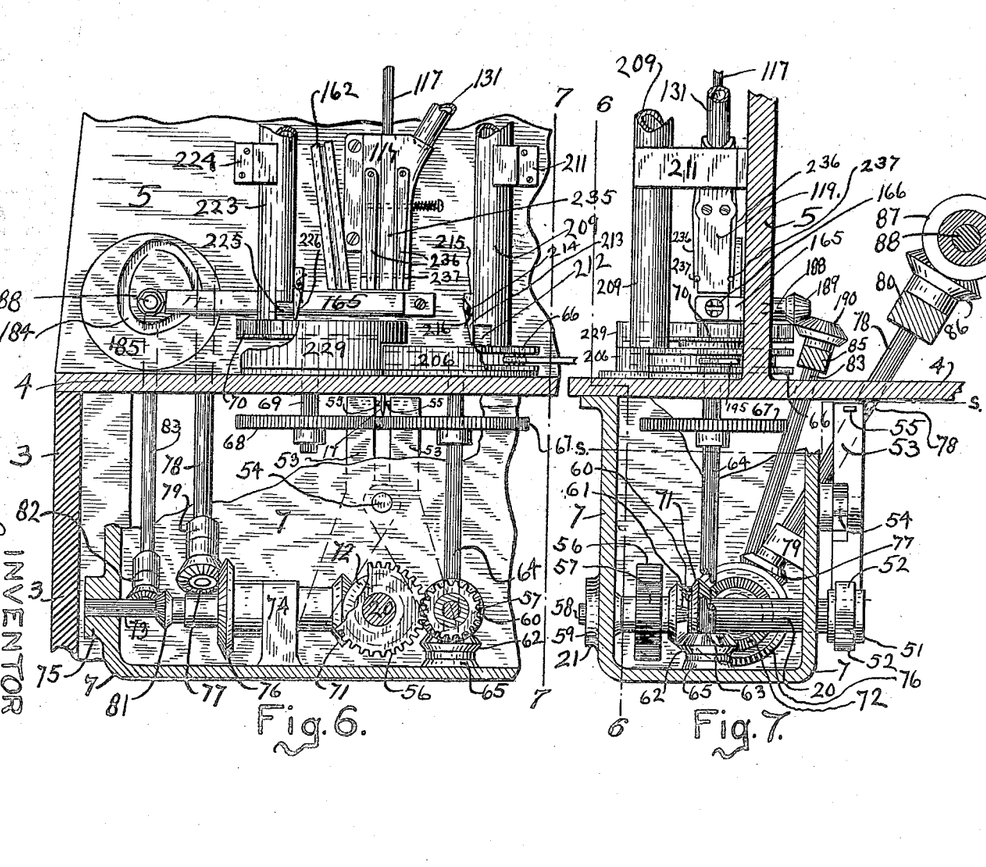
Figure 6 is a sectional front elevation, showing part broken away to illustrate the gearing below, and the connection of the parts above therewith, and is taken on the line 6—6 of Figure 7.
Figure 7 is a side elevation, taken on the line 7—7 of Figure 6.

Considering the block 108, there is fixed to one side thereof, the inclined way 112, and to the opposite side thereof, the inclined way 113. The lower end of the ways 112 and 113 being farthest away from the block 108. Passing horizontally through the block 108, in its lower part, is a rectangular slot 114, which opens into a channel 115, parallel thereto. Loosely positioned in the block 108, is the head 116 of the rod 117, which rod 117, slidably engages the cylindrical passage 118, which it fits, in the nail handling device 119. Considering again the block 108, with its ways 112 and 113, there is in rolling engagement with the inclined way 112 the roller 120 which is journaled in the bifurcated end of the rod 121. The rod 121 is in sliding engagement with the ears 122 and 123, integral with the lower end of the bracket 124, the outer end of the rod 121 is pivoted to a crank 125 at the point 126. The crank 125 is fixed to the lower end of a rod 127 in journaled engagement with the bracket 124. The upper end of the rod 127 has fixed thereto the leaf 128 which has a notch 129, in its periphery, and is shown in Figure 4 to be in position over a hole 130 in the bracket 124. This hole 130 is in open communication with a tube 131 which terminates loosely in an extension 132, in the nailing device 119. The extension 132 has a channel 133 connecting with the bore of the tube 131, and communicates with the cylindrical passage 118 which is engaged by the rod 117. The receiving hole 130 is positioned at the lower end of the nail chute 134 which has a channel 135, provided for the head of the nail 17, to slide in, there being a slot 136 in the bottom of the channel 135, through which passes the shank of the nail 17. There is a vertical slot in the rear of the front plate 5 in the rear of the bracket 124, communicating with the receiving hole 130, permitting the passage of the shank of the nail 17 thereto. The nails being picked off individually at the bottom of the chute 134, as they enter the notch 129, in the leaf 128, as the leaf 128 is reciprocated through an angle, and permits the nail to drop through the receiving hole 130. The upper end of the chute 134, is in communication with a suitable opening in the frame 11 of the hopper 12, there being a U-shaped extension 137 arranged around the slot to strengthen the frame 11 at that point. The rod 121 is kept normally pressed toward the block 108 by means of the compression spring 138 which bears against the washer 139 held by the pin 140 on the rod 121.

Figures 1, 13, 30:
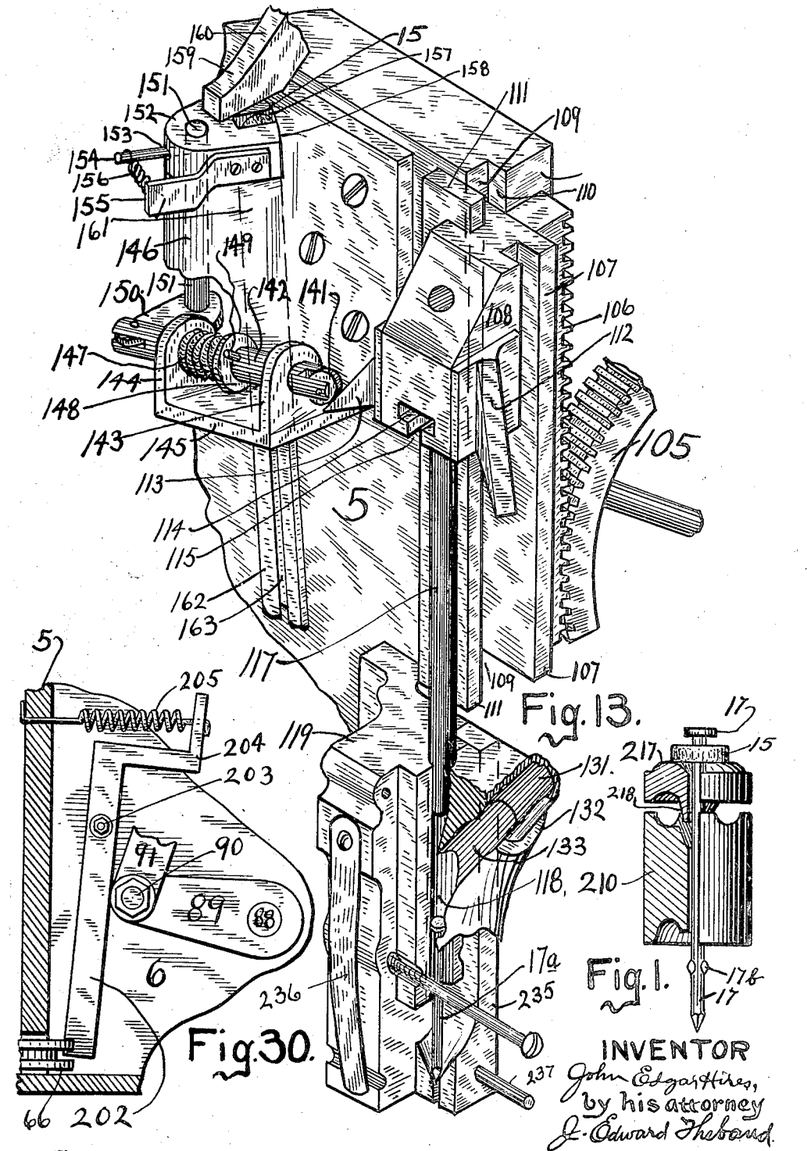
Figure 1 is an elevation, partly in section, of the insulator knob assembled.
Figure 13 is a perspective view of some of the upper parts of the machine, including the nail positioning device and the washer feed.
Figure 30 is a detached view showing the disc locking lever in locking position.
Figure 2:
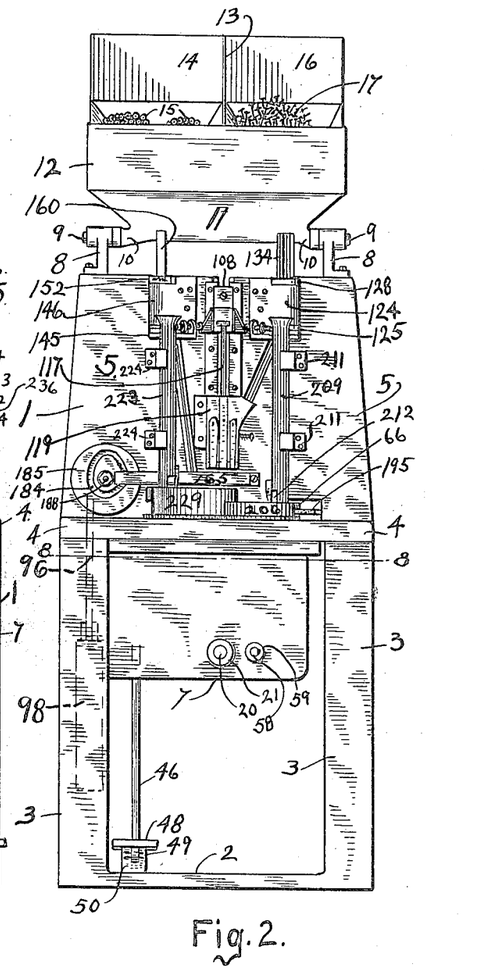
Figure 2 is a front elevation of the assembling machine.
Figure 3:
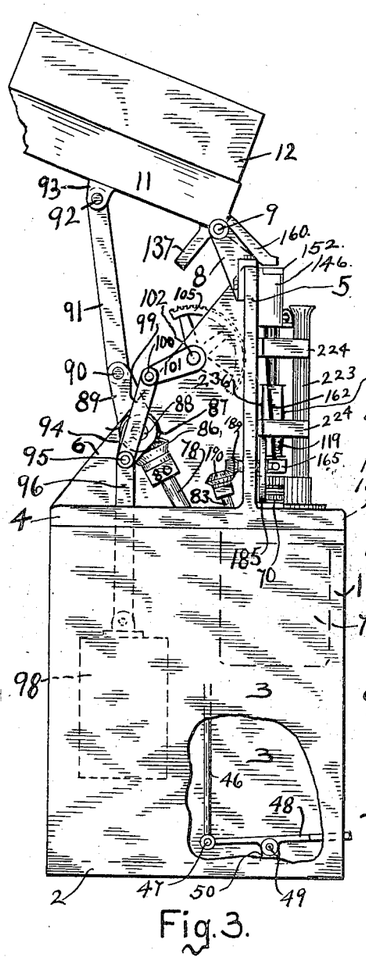
Figure 3 is a side elevation of the same.

Considering now the opposite side of the block 108, there is shown a roller 141 in rolling engagement with the inclined way 113. The roller 141 is journaled in the bifurcated end of the rod 142 which is adapted to reciprocate within the ears 143 and 144, which are integral with an extention 145 of the bracket 146. The rod 142 is normally pressed toward the inclined way 113 by the compression spring 147, pressing against a washer 148, held by the pin 149, in a similar manner to that described for the rod 121 with its connected parts on the opposite side of the block 108. The outer end of the rod 142 pivotally engages a crank 150, which is fixed to a vertical rod 151, adapted to turn within the bracket 146. In loose engagement with the upper end of the rod 151 is a leaf 152, which has a horizontal slot 153, extending through it from the rod 151. In reciprocal engagement with this slot 153 is the pin 154 which is fixed radially within the upper part of the rod 151. Fixed to one side of the leaf 152, is the arm 155, which is connected to the pin 154 by the tension spring 156, normally holding the pin 154 against the end of the slot 153 nearest the arm 155. The leaf 152 has a slot 157 in its peripheral end 158. There is shown a washer 15 engaging the slot 157. Above the leaf 152, and in registration with one position of the slot 157, is the end 159 of the chute or conduit 160, the other end of the chute or conduit 160 communicating with an opening in the frame 11 of the hopper 12, which opening is directly connected with the compartment 14 containing the washers 15. Communicating with the slot 157, in the position shown in Figure 13, is a channel 161, which is in open communication with a chute 162, shaped to permit the washer 15 to pass therethrough in the plane of one of its surfaces. In the chute 162 is a slot 163 provided for observation as to the position of the washer 15 therein, or passing therethrough. The chute 162 has a twist so as to guide the washer 15 to enter a hole 164 in the long housing 165, with the plane of the washer parallel to the face of the front plate 5. The washer 15 enters the front or forked portion 166 of the washer positioning plunger 167.

Figures 20, 21, 22, 23, 24, 25:
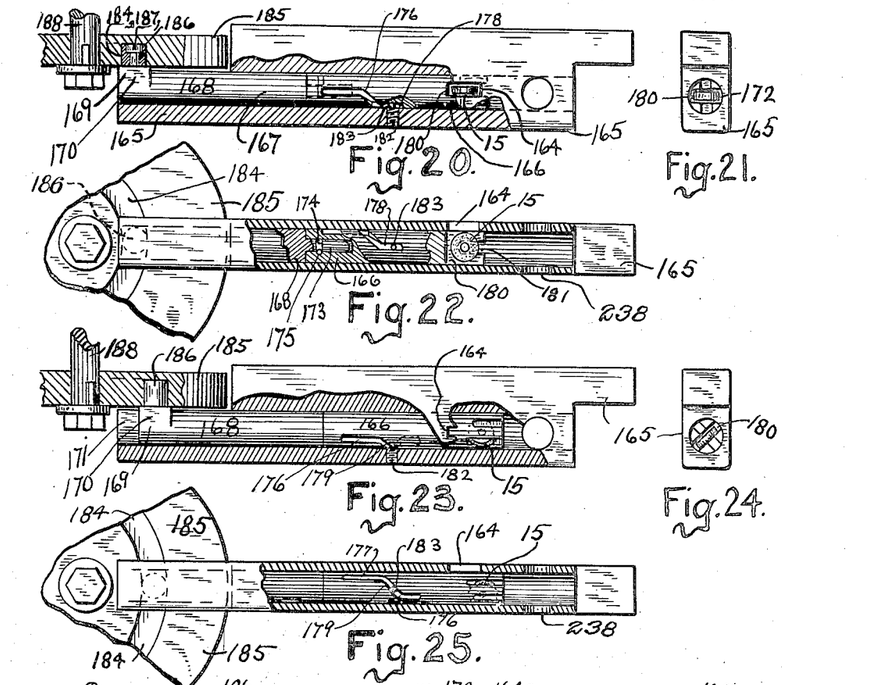
Figure 20 is a top plan, partly broken away, showing the washer positioning plunger in its housing, as well as its connection with the cam, at the initial end of its stroke, where the washer is received.
Figure 21 is an end elevation of housing shown in Figure 20, showing also the initial position of the washer inside.
Figure 22 is a side elevation of the parts shown in Figure 20, for the initial position of the washer.
Figure 23 is another top plan of the parts shown in Figure 20, but with the washer positioning plunger relatively in an intermediate position.
Figure 24 is an end elevation of the housing, as shown in Figure 23, with the washer turned half way from the plane of its initial position.
Figure 25 is a side elevation of the parts in intermediate position, as shown in Figure 23.

The rear portion 168, of the plunger 167, terminates in a guiding head 169, having parallel surfaces 170 for engaging the parallel ways 171, of the housing 165. The body of the plunger 167 slidingly engages the cylindrical hole 172, in the housing 165. The rear portion 168 is permitted to reciprocate only, while the forked portion 166 both reciprocates and turns, but is connected with the portion 168 by a joint which prevents longitudinal separation while permitting relative turning. The central stem 173 of the portion 168, integral therewith, is journaled concentrically in the portion 166, but having an annular groove 174 engaged by a pin 175 fixed transversely in the portion 166. On the surface of the plunger portion 166 is shown a groove 176, the ends 177 and 178 thereof, being longitudinal on said portion but being angularly spaced and connected continuously by a diagonal portion 179. The outer end of the plunger portion 166 is provided with a slot 180 for receiving the washer 15, and is also provided with a cross slot 181 for receiving the shank of a nail 17. The slots 180 and 181 forming a forked end of the plunger portion 166. The part 177 of the groove 176 is in the plane of the slot 180, and the part 178, is in the plane of the slot 181, at right angles to the plane of 177 and 180. In figures 20 and 23 is shown a screw 182, having a cylindrical point 183, engaging the part 178 of the groove 176. This is the initial position of the parts, as they receive the washer 15 from the chute 162. While in this position, the groove 184 of the cam 185 is engaged by a roller 186, journaled on a pin 187, fixed in the head 169 of the plunger 167.

The position of the roller 186, for the initial position of the plunger 167, occupies the groove 184, nearest to the cam shaft 188.

An enlarged view of the cam 185 is shown in Figure 16, to illustrate the development of the cam groove 184, which governs the reciprocating movement of the plunger 167. The development of the cam groove 184 is explained below in connection with the description of the operation and synchronous movements of the machine parts.

There remains to be described, the detailed formation of the discs 66 and 70, and the feeding tubes for the porcelain parts. The disc 66 is provided with six recesses 191, which are spaced sixty degrees apart. The disc 66 is angularly fixed upon the shaft 64 to have one of the recesses 191, diametrically in line with the line between the shafts 64 and 69, when the teeth of the intermittent gears 62 are not in mesh for turning, although respectively positioned for subsequent turning. The disc 66 is provided with a groove 192, the bottom of which is of sufficiently small curvature, to permit of the positioning of the finger 193 on the guide wall 194, to be back of the bottom of a recess 191, as the finger 193 is passed by said recess 191. The groove 192 is engaged on the side, opposite to the finger 193, by a brake arm 195, having a frictional substance 196, fixed thereto and in contact with the bottom of the groove 192. The brake arm 195, is angular and is pivoted at 197, upon the table top 4. The opposite end of the brake arm 195, has bearing against it, a spring 198, the pressure of which, is regulated by a screw 199, in threaded engagement with a post 200 on the table top 4. The purpose of this brake arm arrangement is to check the momentum of the disc 66 and the parts connected therewith. In the upper flange of the disc 66, are shown notches 201, which are engaged intermittently by the lower part of the holding lever 202, which is pivoted at 203 to one of the walls 6, positioned to be engaged by the crank 89, in its rotation, to throw the lower end of the holding lever 202 in engagement with one of the notches 201, when one of the recesses 191 is in line with the shafts 64 and 69, to temporarily hold the disc 66 in position. The holding lever 202 has an L-extension 204 engaged by a tension spring 205, fixed in the front plate 5, to normally hold the holding lever 202 out of engagement with the disc 66. In front of the disc 66, and spaced therefrom, is a curved guide 206, concentric with the shaft 64 and having a flange 207 reaching in below the recesses 191, forming a floor thereto. The curved guide 206, is spaced from the disc 66, permitting the finger 208 of the feeding tube 209 to enter therein and is positioned to contact the knob part 210, to retain the same within the recess 191, as the knob part 210 moves from the feeding tube 209 to the line between the shafts 64 and 69. This feeding tube 209 is of sufficient internal diameter, to permit the lower knob part 210 to pass. The knob is shown in Figure 1. The feeding tube 209 is positioned by brackets 211, fixed upon the front plate 5, to be directly above, and register with, one of the recesses 191, which is one hundred and twenty degrees from the line between the shafts 64 and 69. This feeding tube 209 has at its lower end a recess 212, in front of which, is positioned a finger 213, pivoted at 214 upon a block 215, fixed upon the feeding tube 209. There is a spring 216 normally holding the finger 213 vertical and against the tube 209, and permits of removing a porcelain knob part 210, above the disc 66, while normally acting as a guide, after the porcelain part 210, is entered into one of the recesses 191 of the disc 66. The top 217 of the knob has a central lower projection 218 reaching below the level of the lower periphery of the part 217 necessitating the formation of an annular groove 219 in the upper face of the disc 70 in permitting the knob part 217 to rest squarely upon the face of the disc 70. The disc 70 also has six recesses 220 equally spaced at sixty degrees. The disc 70 is so fixed upon the shaft 69, that when the cranks 67 and 68 are in mesh, a recess 220 will register directly above one of the recesses 191 of the disc 66, diametrically in line with the centers of the shafts 64 and 69. The disc 70 has a lower thin plate 221, having six radial slots 222 centrally positioned below the recess 220. These slots 222 extend inwardly beyond the center of the curved back of the recess 220 and are of sufficient width to easily pass the shank of the nail 17. Positioned above the disc 70, to register with the recesses 220, is a feeding tube 223, positioned by the brackets 224 to be one hundred and twenty degrees from the line between the centers of the shafts 64 and 69. There is a notch 225, in the lower end of the feeding tube 223, of sufficient size to permit of taking out a porcelain top 217. Similar to the finger 213, is a finger 226 pivoted on the block 227 fixed upon the feeding tube 223 and normally held vertical by the spring 228 and serves as does the finger 213, to assist in guiding the porcelain part into one of the recesses 220. In the rotation of the disc 70, the projection 218 of the top 217 passes freely through the annular groove 219, while the top 217 is resting upon the top surface of the disc 70. In front of the disc 70 and concentric therewith, is spaced a curved guide 229, which serves to keep the knob top 217 in place in the recess 220, as it passes from the feeding tube 223 to the line between the shafts 64 and 69. The tube 223 has a finger similar to the finger 208 of the tube 209, which extends into the recess between the disc 70 and the guide 229. The discs 66 and 70 freely move through an aperture in the front wall 5, just above the table top 4.

Figure 15:
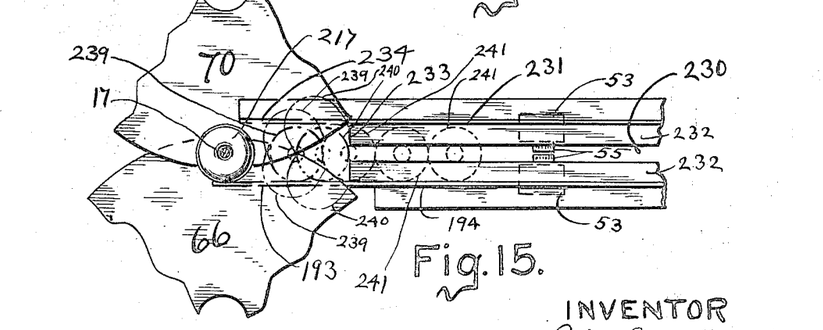
Figure 15 is a top plan of part of said discs, showing the portions thereof coming together with the knob and diagrammatically illustrating the manner in which the knobs feed into the guiding channel and pass over the swaging jaws for the final operation.

To the rear of the front plate 5 and on the table top 4, extends the discharging channel 230, having guide walls 194 and 231. These guide walls 194 and 231 have inturned flanges 232, which begin at the point 233. The guide wall 231 has an extension 234, so positioned, as to hold between it, and the finger 193, the porcelain knob part 210, while the same is diametrically in line with the centers of the shafts 64 and 69. The feeding of the knob into the channel 230 is diagrammatically illustrated in Figure 15, and is also described in connection with the operation of the machine.

Figure 14:
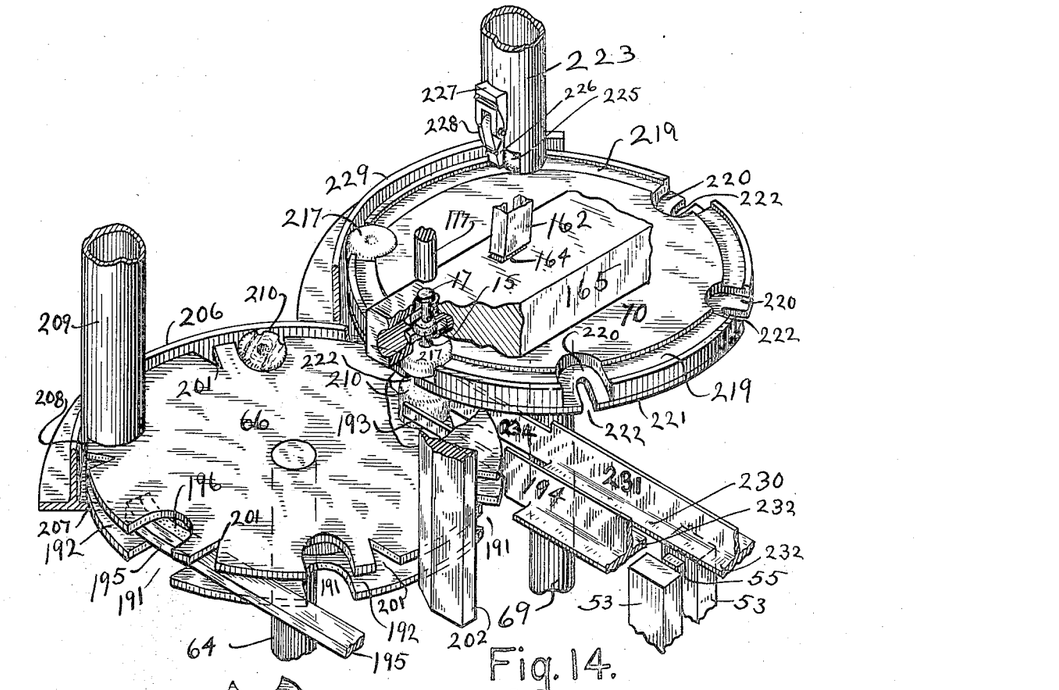
Figure 14 is a perspective view of the disc parts of the machine, with allied parts for positioning the knob parts, the nail and the washer, for assembling and discharging the same into a guiding channel, when complete.

In operation, starting with the machine disconnected from the power, washers 15 and nails 17, are placed in their respective compartments 14 and 16 of the hopper 12 and knob tops 217 are dropped by the operator into the tube 223, having the projection 218 down, so that when the piece reaches the face of the disc 70, its projection 218 hangs in the groove 219. Simultaneously, knob parts 210 are dropped into the tube 209 to rest, right side up, upon the face of the disc 66. With the machine thus loaded, the operator depresses the foot lever 48, causing the rod 46 to rise and lift the outer end of the lever 40 against the action of the spring 43, to release the wedge cam 39 from engagement with the head 38 of the key 33, permitting the same to be normally thrown inwardly by the spring 37 to engage the revolving slot 32, of the revolving fly wheel 29, thus starting the parts in motion. The shaft 20 turns in a counter-clockwise direction, as we look at the shaft from the face of the machine. The gear 56 meshing with the gear 57, of half its size, is then turned in a clockwise direction, and with it is turned one of the intermittent gears 60, so that the set of teeth 61, engages the set of teeth 63, on the companion gear 62, turning the same in a clockwise direction as we look down upon it. The shaft 64 is thus turned, and having fixed thereto the spur gear 67, with the gear 68 of equal size in mesh therewith, and the discs 66 and 70 being fixed upon the respective shafts 64 and 69, the disc 70 turns in the counter-clockwise direction, while the disc 66 turns in the clockwise direction. As these discs turn, the knob parts 217 and 210 drop into respective recesses 220 and 191, the knob part 217 resting upon the plate 221 of the disc 70, and the knob part 210, resting upon the flange 207, of the curved guide 206. The discs are turned through an angle of 60 degrees each time the intermittent gears mesh, and the knob parts are brought together in line with the shafts 64 and 69, as is shown in Figure 14. As the knob parts 217 and 210 are moved by the discs from their respective tubes 223 and 209, in line with one another, the washer handling and nail handling members are operating in the following manner. These devices are simultaneously operated by the reciprocating movement of the block 108, which is actuated through the engagement of the segmental gear 105 with the rack 106. The segmental gear 105, being oscillated by the shaft 102, which gets its oscillation from the crank 101, the link 99, and the full rotation of the crank 94, on the shaft 88, which shaft, through the mitre gears 87 and 86, turns at the same rate as the shaft 78. The shaft 78 makes two revolutions for one revolution of the main shaft 20. The shaft 73 revolves at the same rate as the shaft 20 through the mitre gears 71 and 72, and the shaft 78 makes twice the number of revolutions as the shaft 73, on account of the beveled gears 76 and 77 being respectively two to one. With the rotation of the crank 89 on the shaft 88, the hopper 12 is tilted up and down to cause its contents to shift from end to end to position the washers and nails to feed individually into the respective chutes 160 and 134. The upper ends of these last named chutes terminate closely to the axis of oscillation of the hopper 12.

For one revolution of the shaft 20, there are two oscillations of the block 108, and two 60 degree movements of the discs 66 and 70, the gears being so keyed to their respective shafts, that the block 108 starts down when the teeth 61 of the gear 60 are just leaving off mesh with one of the sets of teeth 63 of the gear 62. The previous up movement of the block 108, bringing the inclined ways 112 and 113 into engagement with the respective rollers 120 and 141, causes the cranks 125 and 150 to turn outwardly, and respective leaves 128 and 152, on the shafts 127 and 151, to turn inwardly, whereby a nail lodged in the notch 129 of the leaf 128 is picked off and dropped through the hole 130 and the tube 131, into the passage 118, taking the position $17^a$, having its point resting upon the inclined inner surfaces of the heads of the strips 235, of the nail handling device 119. These strips 235 are normally held together by the leaf springs 236, in front and rear, which bear against the pins 237, in the heads of the strips 235. At the same time, the leaf 152, moving inwardly, carries a washer 15 from under the chute 160, to the hole at the top of the channel 161, which leads into the chute 162, from which the washer 15 drops into the hole 164 in the housing 165, to rest temporarily upon the plunger 167.

Referring now to the washer positioning device, the shaft 83, by its engagement with the mitre gears 81 and 82, turns at the same rate as shaft 73, and at half the rate of either the shaft 78 or the gear 60. On account of the bevel gears 190 and 189, being respectively in ratio of two to one, the cam shaft 188 will make a full revolution, every time the discs 66 and 70 make a sixth of a turn, and the cam 185 will turn clock-wise, as we look at its face.

Figures 26, 27, 28, 29:
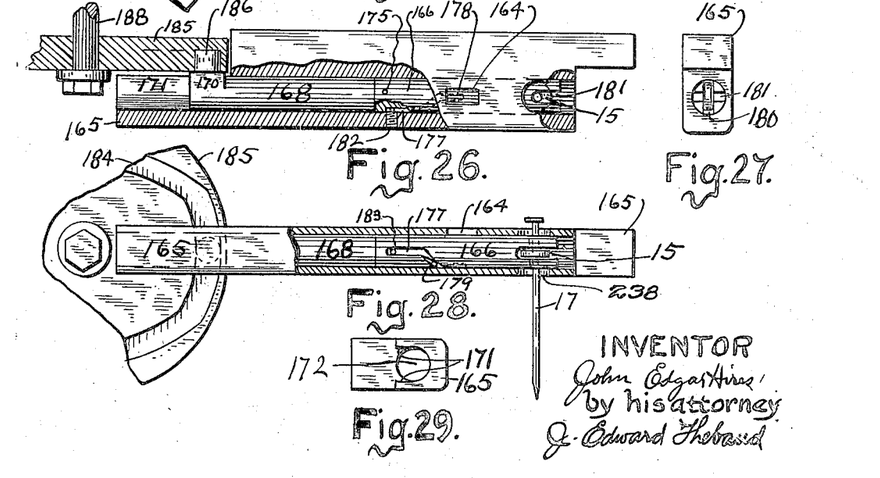
Figure 26 is a third top plan of the parts shown in Figure 20, but with the washer positioning plunger holding the washer at the end of its stroke, to receive the nail.
Figure 27 is an end elevation of the housing, as shown in Figure 26, with the washer fully turned ninety degrees from its initial position.
Figure 28 is a side elevation of the parts in terminal position, as shown in Figure 26.
Figure 29 is an end elevation of the washer plunger housing, next the cam.

The cam groove 184 is so formed as to have (see Figure 16) two circular portions, of short arc and different radii, but concentric on opposite sides of the cam center, for the purpose of permitting partial rotations of the cam 185, while the attached plunger 167 stands still or dwells at its initial and final positions, within its housing 165. The concentric arcs of the groove 184, are defined by the angles D and B for the respective initial and final positions of the plunger 167. The continuity of the remaining portions of the groove 184, with the arc portions is formed by the portions within the angles C and A. Considering the natural rotation of the cam 185, the portion within the angle C is of increasing radii of curvature, while the portion within the angle A is of decreasing radii of curvature. With the groove 184 of this formation, and engaged by the roller 186 attached to the plunger 167, a washer 15 is handled as follows: As the plunger 167 returns to its initial position in the cycle of its movements, with a washer 15 resting upon the body of the forked portion 166, the washer will drop from the hole 164 into the slot 180, and will be temporarily held there under the hole 164, while the roller relatively passes through the angle D, but as the angle C is entered the plunger 167 starts forward with its washer, in response to the increase of the radii of the path of the groove 184, until the angle B is entered, when it stands still, while the roller 186 dwells within this angle, after which the plunger starts back as the roller 186 passes through the angle A, where the groove is of decreasing radii of curvature, pulling the plunger back to its initial position, completing its cycle of movements longitudinally. But while going through these longitudinal movemnts, the part 168 is prevented from turning, by the engagement of the parallel flat sides 170, of the head 169, with the ways 171 of the housing 165, and the part 166 is forced to turn through an angle of 90 degrees, by virtue of the engagement of the fixed point 183, of the screw 182, slidingly with the groove 176, as the helical or diagonal portion 179 of the groove 176 is traversed in either direction. During the end portions of the longitudinal travel of the plunger 167, the point 183 dwells in either of the longitudinal portions 177 or 178, of the groove 176, when the forked part 166 of the plunger 167, is held against turning. During the engagement of the point 183 with the helical part 179 of the groove 176, in the forward movement of the plunger 167, the washer 15 is turned from a vertical to a horizontal position, as it reaches registration with the holes 238 of the housing 165. The initial position of the plunger 167, where it receives the washer 15 from the hole 164, is illustrated in Figures 20, 21 and 22, with the point 183 occupying the groove portion 178. With the washer going forward and half turned through the 90 degree angle, the point 183 occupies the middle of the helical part 179 of the groove 176, as is shown in Figures 23, 24 and 25. With the washer 15 registering with the holes 238, for receiving the nail 17, the point 183 occupies the longitudinal portion 177 of the groove 176, as shown in Figures 26, 27 and 28.

When the plunger 167 reaches its final position, a washer 15, held in the slot 180 in a horizontal position, is centrally in line with a nail 17, held in between the leaves 235 of the nail handling device 119, under the descending rod 117, (see Figures 13 and 14). At the same time, knob parts 217 and 210, have been carried by the respective discs 70 and 66 to register over one another, having the central hole of the knob parts in line with the nail 17, held above as in the position 17$^a$ of Figure 13, when, upon the continued synchronized movement of all parts of the machine, the nail is driven down by the rod 117, to be threaded by the washer 15, and into the holes of the knob parts 217 and 210, and as soon as thus engaged, the plunger 167 begins its return stroke, the roller 186 entering the angle A, and as soon as the plunger 167 is withdrawn, the nail and washer are forced out through the lower hole 238, in the housing 165, when the gears 60 and 62, start meshing again to give the discs another one-sixth of a turn, bringing another set of knob parts in register with one another and the rod 117, while the plunger 167 goes through another cycle, bringing on another washer. As the discs 66 and 70 are making this next one-sixth turn, the corners of the recesses 191 and 220, back of the assembled knob, push the same into the channel 230, by the aid of the finger 193 and the wall extension 234, taking up successively the dot and dash position 239, the two dot and dash position 240 and the positions 241, shown in broken lines, until the nail 17, in the assembled knob comes between the jaws 55 of the swage, the cam 51 of which, is timed in position on the shaft 20, to operate and broaden the nail at 17$^b$ larger than the hole in the knob which it occupies.

Each time the gear 60 makes a turn and the teeth 61 thereof pass out of mesh with the teeth 63 of the gear 62, the crank 89 is timed to come in contact with the locking lever 202 to throw it into engagement with a notch 201, of the disc 66, to arrest its momentum, as shown in Figure 30. As the crank turns away from the lever 202, the spring 205 draws the end of the lever 202 from engagement with the notch 201, leaving the disc 66 free to turn, as is shown in Figure 14. To further asborb the momentum of the discs 66 and 70, I provide a frictional lever 195, with its bearing substance 196, forced against the base of the groove 192, of the disc 66.

As the finished knobs file out of the channel 230, they are caught in a proper receptacle and taken away.

All the moving parts of the machine are so fixed in relation to the angular position of the gears and cranks on their respective shafts, as to function synchronously, during the routing and assembling of the parts, as described above.

Figure 8:
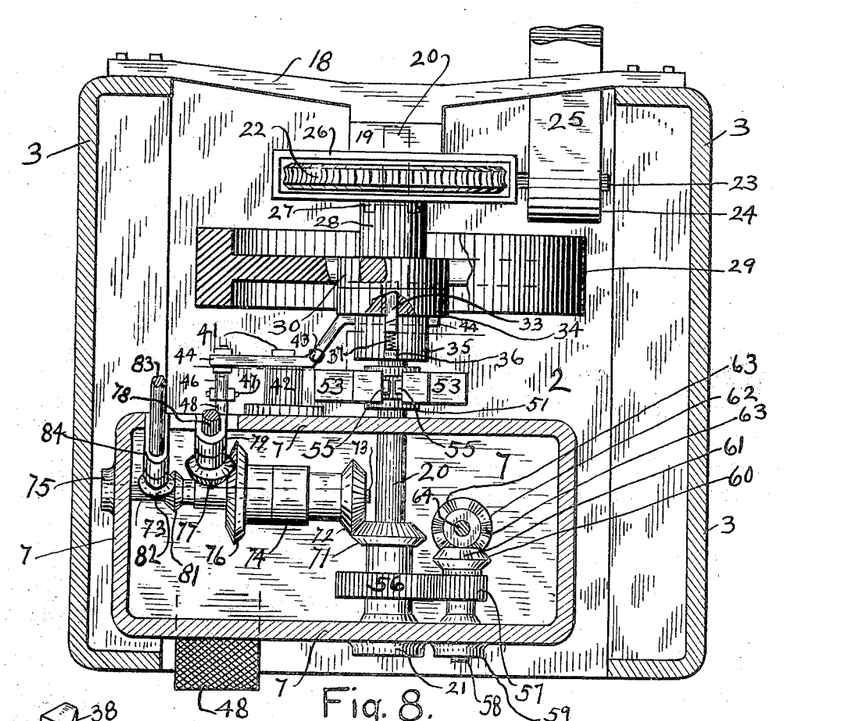
Figure 8 is a top plan of the mechanism below the table level of the machine, showing in plan, the lower parts illustrated in Figures 6 and 7, and also showing the speed reducing gearing with the controlling device, taken on the line 8—8 of Figure 2.

While the machine is in operation, the operator keeps his foot lever 48, pressed down, so as to keep the cam lever 40 in the position 40ª, shown in Figure 9, permitting the key 33 to become engaged with the slot 32 of the fly wheel 29, which is run continuously by power connection, described for Figures 8 and 9. When the operator desires to stop the machine, he releases the foot lever 48, permitting the spring 43 to pull up the lever 40, into the full line position of figure 9, so that upon the counter-clockwise rotation of the ring 34, journaled upon the shaft 20, the head 38 of the key 33, will engage the wedge 39 and become withdrawn from the slot 32, throwing out the power connection and stopping the machine.

Having thus described one embodiment of my invention, I do not wish to be confined to the same, inasmuch as detail of construction can be changed without departing from the spirit and scope of this invention, hence I claim,

1. In a machine for assembling the parts of an article and their holding device together, two assembling elements, a series of pockets in each of said assembling elements, adapted to receive said parts, said elements being positioned, relative to one another, to have the pockets of one of the elements, register with the pockets of the other element seriatim, during their relative movements, means connecting said elements to cause them to operate in unison for the sequential registration of said pockets, in the respective elements, and a holding device positioning means for assembling said device with said parts, at their registered position.

2. In a machine for assembling parts of an article and their holding device together, a pair of discs adjoining one another and positioned to rotate simultaneously while overlapping one another, pockets at the periphery of each disc for receiving said parts, the spacing of the pockets in one disc corresponding to the spacing of the pockets in the other disc, for the sequential registration of the pockets of the respective discs as they rotate, means for rotating said discs, means connecting said discs for causing them to operate for the sequential registration of said pockets in the respective discs, and holding device positioning means for assembling said device with said parts at their registered position.

3. A machine adapted to assemble parts of an insulator knob, having two parts with a hole through each, a flexible washer, and a holding member, for holding said parts together, said machine comprising, a frame, a main shaft, means for driving said main shaft, a receptacle on said frame, adapted to hold and individually discharge said washers and said members, a washer feeding means, a member feeding means, each adapted to receive respectively, washers and members from said receptacle, means for actuating both of said feeding means simultaneously, a member positioning device, a knob top part compartment, a knob base part compartment, knob part positioning means, adapted to take said knob parts individually from said compartments and bring them in registration with one another, said compartments being so fixed on said frame, to be positioned to feed knob parts to said knob part positioning means, said washer feeding and said member feeding means being adapted to bring a washer and a holding member in line with said registered knob parts, whereby said member feeding means assembles said member with said washer and with said knob parts, means for distorting said member, to prevent its withdrawal from said knob parts, means for guiding the assembled knob parts to said distorting means, and gearing synchronously connected with various parts of said machine to cause said machine parts to function co-ordinately in a cycle, whereby said knob parts, said washer and said holding means are assembled.

4. A machine adapted to assemble parts of an insulator knob, having two parts, with a hole through each, a flexible washer, and a holding member, said machine comprising a frame, a power driven element engaging said frame, a main shaft, a clutch, for releasably connecting said main shaft with said power driven element, an oscillating receptacle, on said frame, adapted to contain and discharge said washers and said members, a washer feeding means, each adapted to receive respectively, washers and members from said receptacle, a washer positioning device, a member positioning device, a knob top compartment, a knob base compartment, said compartments being fixed to said frame, knob part positioning means, adapted to take said knob parts, individually from said compartments, and bring them in registration with one another, said washer feeding and said member feeding means being adapted to bring a washer and a holding member in line with said registered knob parts, whereby said member feeding means assembles said member with said washer, and with said knob parts, means for distorting said member to prevent its withdrawal from said knob parts, means for guiding the assembled knob parts to said distorting means, and gearing synchronously connecting the various parts of the machine causing said machine parts to function co-ordinately in their cycles, whereby said knob parts, said washer and said holding means are assembled.

5. In a machine for assembling knob parts and holding means together, a pair of discs adjoining one another and positioned to rotate in opposite directions, while overlapping one another, pockets in the periphery of each disc for receiving a knob part, there being the same number of pockets on each disc, equally spaced, means for rotating said discs in opposite directions, to bring a pocket of one disc in registration with a pocket on the other disc, and member positioning means for assembling said holding means with said knob parts at their registered position.

6. In a machine for assembling knob parts together with holding means and a holding member, a pair of discs adjoining one another, and positioned to rotate in opposite directions, while overlapping one another, pockets in the periphery of each disc for receiving a knob part, said pockets being equally spaced on said discs, means for rotating said discs in opposite directions to bring a pocket of one disc in registration with the pocket of the other disc, member positioning means for assembling said member with said knob parts at their registered position, and arresting means for holding said discs while said member is being assembled with said knob parts.

7. In a machine, including a container for articles and receiving means to which said articles are routed from said container, a conduit next to said container, a chute, said conduit and said chute being adapted to pass said articles, a picking device for taking said articles from said conduit to said chute, and a transmitting device adapted to receive said articles from said chute, to transport and turn the same through an angle into a given position next to said receiving means.

8. In a machine, including a container for articles and receiving means to which said articles are routed from said container, a conduit next to said container, a chute, said conduit and said chute being adapted to pass said articles, a picking device for taking said articles from said conduit to said chute, a transmitting device, comprising a housing, having a channel connecting an end of said chute with said receiving means, an element within said channel adapted for reciprocation between said chute and said receiving means, means for reciprocating said element, means on said element for holding said articles as received from said chute, and means for causing the rotation of said element to turn said articles through an angle while being transported into a given position next to said receiving means.

9. In a machine, including a container for articles, and receiving means to which said articles are routed from said container, a transmitting device, a transferring means adapted to transfer said articles from said container to said transmitting device, said transmitting device including an element adapted for reciprocation between said transferring means and said receiving means, means for reciprocating said element, means on said element for holding said articles as received from said transferring means, and means for causing the rotation of said element to turn said articles through an angle while being transported into a given position next to said receiving means.

10. In a machine, including a container for articles, and receiving means to which said articles are routed from said container, a transmitting device, a transferring means adapted to transfer said articles from said container to said transmitting device, said transmitting device comprising a housing, having a channel between said transferring means and said receiving means, an element within said channel adapted for reciprocation between said transferring means and said receiving means, means for reciprocating said element, means on said element for holding said articles as received from said transferring means, and means for causing the rotation of said element to turn said articles through an angle while being transported by said element into a given position next to said receiving means.

11. In a machine, including a container for articles and receiving means to which said articles are routed from said container, a transmitting device, a transferring means, adapted to transfer said articles from said container to said transmitting device, said transmitting device including an element adapted for reciprocation between said transferring means and said receiving means, means for reciprocating said element, means on said element for holding said articles received from said transferring means, a helical guide on said element, and means engaging said helical guide, whereby in a motion of translation of said element between said transferring means and said receiving means, said element is caused to turn through an angle while transporting said article into a given position next to said receiving means.

12. In a machine, including a container for articles and receiving means to which said articles are routed from said container, a transmitting device, a transferring means, adapted to transfer said articles from said container to said transmitting device, said transmitting device comprising a housing, having a channel between said transferring means and said receiving means, an element within said channel adapted for reciprocation between said transferring means and said receiving means, means for reciprocating said element, means on said element for holding said articles received from said transferring means, a helical guide on said element, and means fixed upon said housing engaging said helical guide, whereby in a motion of translation of said element, between said transferring means and said receiving means, said element is caused to turn said articles through an angle, while transporting said articles into a given position next to said receiving means.

13. In a machine, including a container for articles, and receiving means to which said articles are routed from said container, a transmitting device, a transferring means adapted to transfer said articles from said container to said transmitting device, said transmitting device comprising a housing having a channel between said transferring means and said receiving means, a two-part plunger within said chanel, adapted for reciprocation between said transferring means and said receiving means, a cam engaged by one part of said plunger, for reciprocating the same, means for moving said cam, means on the other part of said plunger for holding said articles, as received from said transferring means, a helical guide on said last named plunger part, means fixed upon said housing for engaging said helical guide to turn said last named plunger part, when moved longitudinally, and means upon said housing engaging the first named plunger part to hold the same from turning while reciprocating, whereby in a motion of translation of said plunger between said transferring means and said receiving means, the plunger part holding the article is caused to turn through an angle, while said cam is giving a motion of translation to said plunger, to bring said article into a given position, next to said receiving means.

14. In a machine, including a container for articles, and receiving means to which said articles are routed from said container, a transmitting device, a transferring means adapted to take articles from said container to said transmitting device, said transmitting device including a member having a slotted end, means for reciprocating said member, and other means for turning the slotted end of said member while being reciprocated, the movement of said member being such as to position its slotted end to receive said articles individually from said transferring means, and to turn the same through an angle, while transporting said article longitudinally into a given position next to said receiving means.

15. In a machine, including a container for articles, and receiving means to which said articles are routed from said container, a transmitting device, a transferring means adapted to transfer said articles from said container to said transmitting device, said transmitting device comprising a housing having a channel between said transferring means and said receiving means, a two-part plunger within said channel adapted for reciprocation between said transferring means and said receiving means, said plunger parts being connected and adapted to turn on one another, a cam engaged by one part of said plunger, for reciprocating the same, a part on said cam being formed to hold said plunger at rest at one end of its travel, and another part on said cam, formed to hold said plunger at rest at the opposite end of its travel, permitting said cam to move during the dwelling of the plunger at either end of its travel, means for moving said cam, means on the other part of said plunger for holding said articles as received from said transferring means, a helical guide on said last named plunger part, means fixed upon said housing for engaging said helical guide to turn said last named plunger part, during its longitudinal movement, and means upon said housing engaging the first named plunger part to hold the same from turning while reciprocating, whereby in a motion of translation of said plunger, between said transferring means and said receiving means, the plunger part engaging said cam is prevented from turning during its reciprocation and the other plunger part holding the article, is caused by said helical guide to turn through an angle, while said cam is giving a motion of translation to said plunger, to bring said article into a given position next to said means.

16. In a machine for assembling two articles, a frame, a container for holding said articles, one set of handling means for each kind of article, each of said handling means comprising, a bracket on said frame, a shaft journaled in said bracket, a picking device at one end of said shaft for picking off one kind of article received from said container, a reciprocating member positioned between the two said handling means, said reciprocating member having an inclined way on each side thereof, each inclined way being disposed toward one of said handling means, a reciprocating element, having one end engaging one of said inclined ways, and means connecting said element with the shaft of said handling means, whereby, upon the reciprocation of said elements by their contact with the respective inclined ways of the reciprocating member, said shafts are oscillated to move said picking devices simultaneously.

17. In a machine for assembling two knob parts, a frame, a tubular compartment for each knob part fixed to said frame, and positioned to permit said knob parts to pass therethrough, a pair of discs, means adapted to turn said discs simultaneously and intermittently in opposite directions at the same rate, there being a plurality of pockets in each disc, so spaced on one disc with relation to the other, as to have successive pockets on said disc, respectively register with one another, as said discs are turned, said tubular compartments being positioned to feed said discs to said pockets individually, and means for receiving said knobs when assembled.

18. In a machine for assembling two knob parts, a frame, a tubular compartment fixed to said frame, there being a compartment for each knob part positioned to permit the same to pass therethrough, a pair of discs, means adapted to turn said discs simultaneously in opposite directions at the same rate, there being a plurality of pockets in each disc, so spaced on one disc with relation to the other, as to have successive pockets on said disc, respectively register with one another, as said discs are turned, said tubular compartments being positioned to feed said discs to said pockets, means for receiving said knobs when assembled, and means for arresting the momentum of said discs as the same are turned.

19. In a machine for assembling knob parts, a frame, a bracket on said frame, a tubular compartment for one kind of said knob parts, means having pockets, into which said knob parts are fed from said tubular compartments, there being a recess at the end of said tubular compartment, next to said means having said pockets, said recess being of sufficient size to permit the withdrawal of one of said knob parts from said compartment, and a spring pressed guide, releasably forming a partial wall on said tubular compartment as a continuation at said recess, whereby said knob part may be released by drawing back said guide.

JOHN EDGAR HIRES.